US009858625B2

(12) United States Patent
Brunn et al.

(10) Patent No.: US 9,858,625 B2
(45) Date of Patent: Jan. 2, 2018

(54) LEVERAGING SKIPPED RELATIONSHIPS IN A SOCIAL NETWORK

(71) Applicant: International Business Machines Corporation, Armonk, NY (US)

(72) Inventors: Jonathan F. Brunn, Logan, UT (US); Jeffrey R. Hoy, Southern Pines, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 14/698,033

(22) Filed: Apr. 28, 2015

(65) Prior Publication Data
US 2016/0321258 A1    Nov. 3, 2016

(51) Int. Cl.
*G06F 17/30*    (2006.01)
*G06Q 50/00*    (2012.01)
*G06Q 10/10*    (2012.01)

(52) U.S. Cl.
CPC ....... *G06Q 50/01* (2013.01); *G06F 17/30867* (2013.01); *G06Q 10/10* (2013.01)

(58) Field of Classification Search
CPC .............. G06Q 50/01; G06F 17/30029; G06F 17/30867
See application file for complete search history.

(56) References Cited

U.S. PATENT DOCUMENTS

| | | | |
|---|---|---|---|
| 2009/0319288 A1* | 12/2009 | Slaney | G06Q 10/10 705/1.1 |
| 2011/0231396 A1 | 9/2011 | Dhara et al. | |
| 2011/0313833 A1 | 12/2011 | Graepel et al. | |
| 2012/0011212 A1 | 1/2012 | He et al. | |
| 2012/0143921 A1* | 6/2012 | Wilson | G06Q 50/01 707/798 |
| 2013/0246449 A1* | 9/2013 | Balannik | G06F 17/30345 707/758 |
| 2013/0311568 A1 | 11/2013 | Wang et al. | |
| 2014/0053087 A1 | 2/2014 | Xiong et al. | |
| 2014/0122605 A1* | 5/2014 | Merom | G06Q 10/10 709/204 |
| 2014/0237046 A1 | 8/2014 | Brooks et al. | |

* cited by examiner

*Primary Examiner* — Sangwoo Ahn
(74) *Attorney, Agent, or Firm* — Scully, Scott, Murphy & Presser, P.C.; L. Jeffrey Kelly

(57) ABSTRACT

The present disclosure provides for leveraging knowledge of one or more skipped relationships in a social network. In one example, the knowledge of the one or more skipped relationships may be utilized to change an action that would otherwise have been taken by the social network (that is, to change an action that would otherwise have been taken by the computer system maintaining the social network).

14 Claims, 9 Drawing Sheets

LEVERAGING SKIPPED RELATIONSHIPS IN A SOCIAL NETWORK

BACKGROUND

The present disclosure relates generally to the field of leveraging skipped relationships in a social network. In various embodiments, systems, methods and computer program products are provided.

In a social network, users typically have the option to create a relationship (such as by sending a relationship invitation or by accepting a relationship invitation) and to not create a relationship (such as by not sending a relationship invitation or by declining a relationship invitation).

To encourage positive behavior, social networks typically do not provide an option to create negative relationships. In this regard, a user who has (outside the social network) a negative relationship with another user often simply avoids requesting a relationship with that other person (or avoids accepting a relationship invitation from that other person—sometimes without specifically declining the relationship invitation). From the perspective of the computer system maintaining the social network, it would not be known, for example, if the first user simply missed an opportunity, or if the first user is intentionally avoiding creating a relationship with the second user.

SUMMARY

The present disclosure provides for leveraging knowledge of one or more skipped relationships in a social network. In one example, the knowledge of the one or more skipped relationships may be utilized to change an action that would otherwise have been taken by the social network (that is, to change an action that would otherwise have been taken by the computer system maintaining the social network).

In one embodiment, a computer-implemented method for adjusting at least one automatic action associated with a social network based upon an absence of an acceptance of a recommendation to a first user to form a social network relationship with a second user is provided, the method comprising: providing, by a processor, the recommendation to the first user to form the relationship with the second user, wherein the first user and the second user have been predicted as likely to form the relationship; monitoring, by the processor, for acceptance by the first user of the recommendation; classifying, by the processor, the first user and the second user as having an implicitly negative relationship based upon a detection, by the monitoring, of an absence of acceptance of the recommendation, wherein the classification of the first user and the second user as having an implicitly negative relationship has a strength based upon a confidence value that the recommendation was intentionally skipped by the first user; and adjusting, by the processor, the at least one automatic action based upon the classification of the first user and the second user as having an implicitly negative relationship, wherein the at least one automatic action is adjusted to operate differently from a manner in which the automatic action would have operated if the automatic action had not been adjusted.

In another embodiment, a computer readable storage medium, tangibly embodying a program of instructions executable by the computer for adjusting at least one automatic action associated with a social network based upon an absence of an acceptance of a recommendation to a first user to form a social network relationship with a second user is provided, the program of instructions, when executing, performing the following steps: providing the recommendation to the first user to form the relationship with the second user, wherein the first user and the second user have been predicted as likely to form the relationship; monitoring for acceptance by the first user of the recommendation; classifying the first user and the second user as having an implicitly negative relationship based upon a detection, by the monitoring, of an absence of acceptance of the recommendation, wherein the classification of the first user and the second user as having an implicitly negative relationship has a strength based upon a confidence value that the recommendation was intentionally skipped by the first user; and adjusting the at least one automatic action based upon the classification of the first user and the second user as having an implicitly negative relationship, wherein the at least one automatic action is adjusted to operate differently from a manner in which the automatic action would have operated if the automatic action had not been adjusted.

In another embodiment, a computer-implemented system for adjusting at least one automatic action associated with a social network based upon an absence of an acceptance of a recommendation to a first user to form a social network relationship with a second user is provided, the system comprising: a processor; and a memory storing computer readable instructions that, when executed by the processor, implement: a providing element configured to provide the recommendation to the first user to form the relationship with the second user, wherein the first user and the second user have been predicted as likely to form the relationship; a monitoring element configured to monitor for acceptance by the first user of the recommendation; a classifying element configured to classify the first user and the second user as having an implicitly negative relationship based upon a detection, by the monitoring element, of an absence of acceptance of the recommendation, wherein the classification of the first user and the second user as having an implicitly negative relationship has a strength based upon a confidence value that the recommendation was intentionally skipped by the first user; and an adjusting element configured to adjust the at least one automatic action based upon the classification of the first user and the second user as having an implicitly negative relationship, wherein the at least one automatic action is adjusted to operate differently from a manner in which the automatic action would have operated if the automatic action had not been adjusted.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, a system may provide for leveraging knowledge of one or more skipped relationships in a social network. In another example, a method may provide for leveraging knowledge of one or more skipped relationships in a social network. In another example, an algorithm may provide for leveraging knowledge of one or more skipped relationships in a social network.

Figure 1:
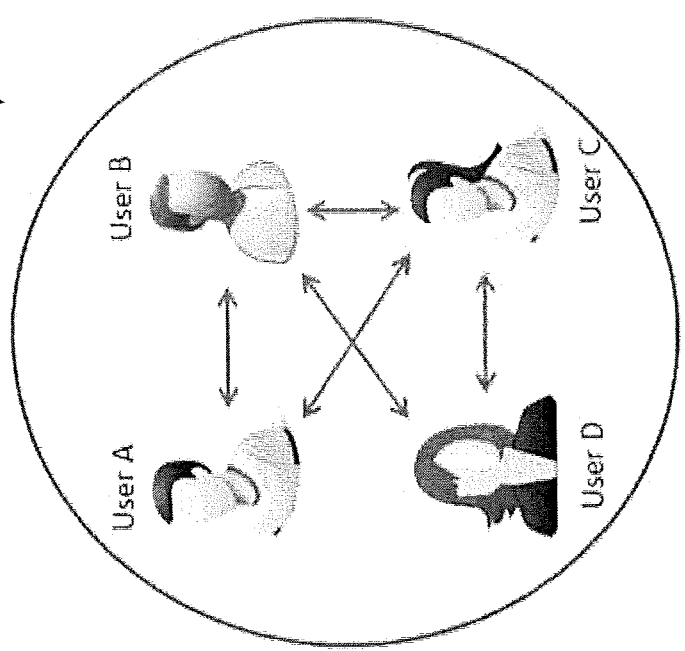
FIG. 1 depicts a diagram showing an example group of members of a social network according to an embodiment.

In one specific example, with reference to FIG. 1, a close-knit 4 member team (comprising User A, User B, User C and User D) at a company may have established the social network relationships (or connections) shown by the arrows (wherein each arrow indicates a relationship between the two respective users). In this case, the computer system maintaining the social network knows that all four members have worked closely together (knowing this, for example, through user registry integration and/or profile analysis). It is also the case that all members of the team have created a relationship with all other members of the team, with the exception that there has been no relationship created between User A and User D. In view of the fact that User A and User D have taken the time to create relationships with all other team members (as well as, for example, many other users outside the team, which additional relationships are not shown in this FIG. 1), the computer system maintaining the social network can infer that a negative relationship may exist between User A and User D.

The present disclosure provides several positive (or "healthy") mechanisms to leverage such inferred (and potentially unreliable) information.

For the purposes of describing and claiming the present invention the term "social network" is intended to refer to a grouping of people (e.g., one or more members or users) according to one or more relationships between and/or among them.

For the purposes of describing and claiming the present invention the term "social network infrastructure" is intended to refer to the computer hardware and/or software used to maintain a social network.

For the purposes of describing and claiming the present invention the term "social network recommendation" (or simply "recommendation") is intended to refer to a communication from a social network infrastructure to a first member of the associated social network regarding a suggestion to form a relationship with a second member of the associated social network.

Reference will now be made to several related mechanisms (including computer systems, methods and algorithms) to leverage information regarding one or more skipped relationships in a social network.

A first of these mechanisms relates to leveraging knowledge of an implicitly negative relationship. In this regard, given the example situation mentioned above (which is depicted in FIG. 1), the social network infrastructure can generate several positive capabilities based on the implicitly negative relationship. For example, the social network infrastructure can de-prioritize a subsequent recommendation to a first member who has already repeatedly skipped one or more previous recommendations (to form a relationship with a second member) provided by the social network infrastructure. Further, from the perspective of the second member, the social network can de-prioritize one or more recommendations to connect with, that is, form a relationship with, the first member, even if the second member has never before been presented the first member as a recommended relationship. The social network infrastructure can further de-prioritize "contact-of-contacts" (or "friend-of friends") through the implicitly negative relationship. In addition, the social network infrastructure can de-prioritize social network content (such as, for example, status updates) through the implicitly negative relationship (where access allows) and/or via contacts-of-contacts communications.

None of the capabilities mentioned above: (a) have a direct negative impact upon either the first or second member; (b) expose member actions to other member; or (c) expose the existence of a negative relationship. Rather, the capabilities simply improve the user experience based on likely relationships.

Another mechanism to leverage information regarding one or more skipped relationships in a social network relates to confirming a recommendation as a bad recommendation. In this regard, a social network infrastructure typically uses analytics to create recommendations (e.g., to determine which members are likely to make the best matches). As described herein, if a member has repeatedly skipped an opportunity to create a relationship, the confidence of the prediction provides an assurance that the member had intentionally skipped creating the relationship. The social network infrastructure can further build a confidence indicator based upon repeated behavior by the member. For example, if a member has been presented a recommendation over and over and the member skips the recommendation each time that the recommendation is presented, the social network infrastructure has a higher confidence that the recommendation was intentionally skipped.

Further, placement of the recommendation may be used to generate further confidence that the member considered the recommendation and intentionally skipped the recommendation. For example, the social network infrastructure may intentionally place a recommendation (either an initial recommendation for a member or a recommendation for a member whose prior recommendation has already been skipped) nearby or between one or more high confidence recommendations. Upon acceptance of the high confidence recommendation(s) but the skipping of the target recommendation, the social network infrastructure uses this information to confirm the existence of the negative relationship.

Another mechanism to leverage information regarding one or more skipped relationships in a social network relates to determining the cause of an implicitly negative relationship. In this regard, in some cases the cause of an implicitly negative relationship can be inferred with some degree of confidence. For example, a person may never create relationships with family, or may never create relationships with coworkers on a social network for personal use. The social network infrastructure can analyze profiles of the members found to have implicitly negative relationships to look for patterns and identify the cause (with any confidence) of the negative relationship. Then, the social network infrastructure can leverage this information in non-negative ways to improve user experience. In one example, the social network infrastructure may look for a cause among attributes of the member (e.g., location, employer, political affiliation, or other characteristics), attributes of the relationship (e.g., family, long term, short term, college), and/or style of posts (e.g., long, short, emotional, personal, unoriginal, novel).

The social network infrastructure may also analyze data from other connected networks. For instance, an enterprise (business) social network connected with a personal social network. If the social network infrastructure of, for example, the personal network, determines that certain members are connected in, for example, the enterprise social network, this information may be used as input to change (e.g., decrease) confidence in the negative relationship or categorize the cause.

Another mechanism to leverage information regarding one or more skipped relationships in a social network relates to improvement of negative relationships. In this regard, the social network infrastructure may look for common causes of negative relationships with a particular member. The social network infrastructure may use this cause determination to, for example, recommend improvements to the target member's profile and/or postings. For instance, the root cause of a number of people not accepting recommendations (not necessarily invitations, but recommendations) to form a relationship with a given member may be determined (e.g., by the social network infrastructure) to be the long style of the posts of this given member. The social network infrastructure may then recommend shorter posts to the given member.

Another mechanism to leverage information regarding one or more skipped relationships in a social network relates to discontinuation of negative attribution. In this regard, the social network infrastructure may no longer consider members to have a negative relationship if such members show positive actions toward each other. In one example, such showing of positive actions may comprise forming a relationship in the social network. In another example, such showing of positive actions may comprise liking, commenting and/or adding positive remarks or messages to each other.

Figure 2:
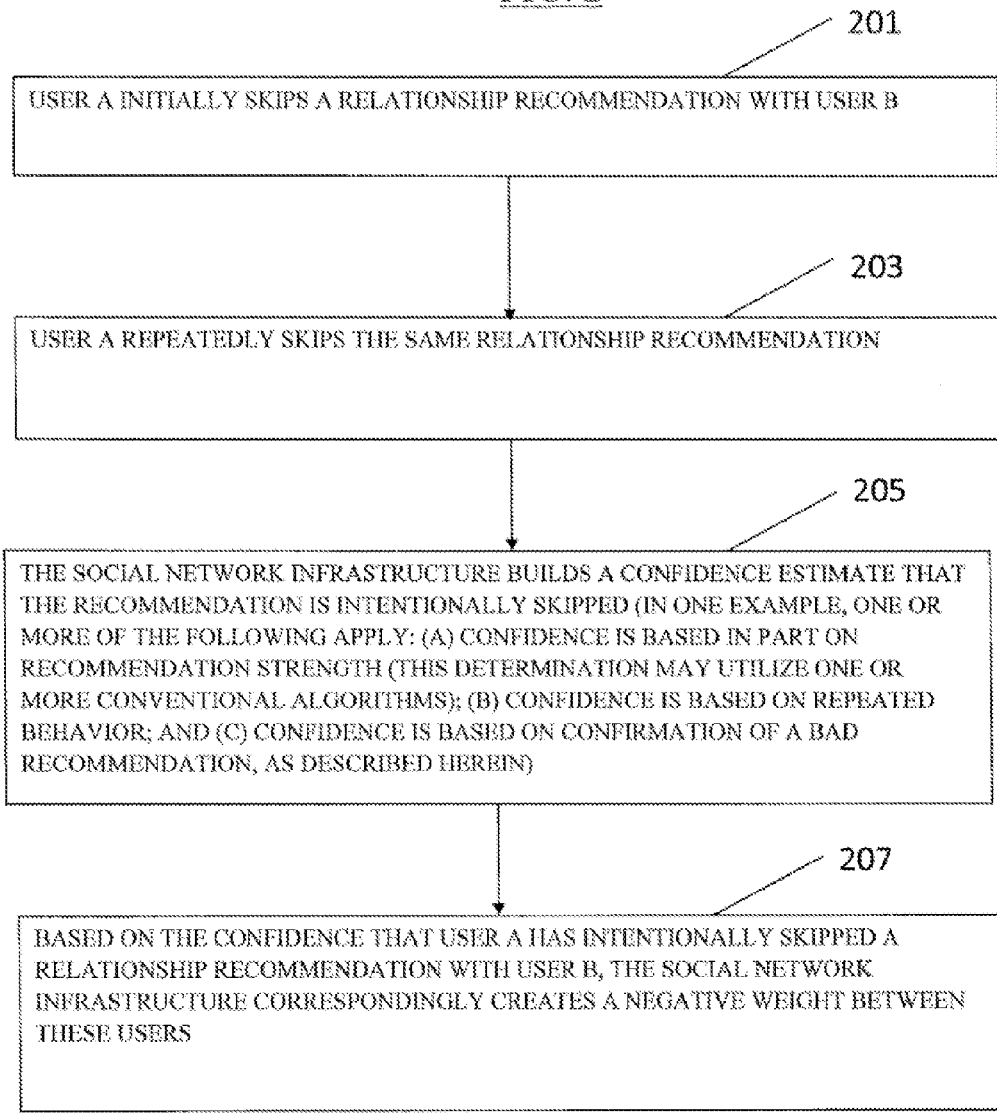
FIG. 2 depicts a flowchart showing a number of example steps associated with a mechanism discussed herein with respect to leveraging knowledge of an implicitly negative relationship according to an embodiment.

Referring now to FIG. 2, depicted is a flowchart showing a number of example steps associated with the mechanism discussed above with respect to leveraging knowledge of an implicitly negative relationship. As seen from this Fig., the example steps comprise the following: at 201—User A initially skips a relationship recommendation with User B; at 203—User A repeatedly skips the same relationship recommendation; at 205—the social network infrastructure builds a confidence estimate that the recommendation is intentionally skipped (in one example, one or more of the following apply: (a) confidence is based in part on recommendation strength (this determination may utilize one or more conventional algorithms); (b) confidence is based on repeated behavior; and (c) confidence is based on confirmation of a bad recommendation, as described herein); and at 207—based on the confidence that User A has intentionally skipped a relationship recommendation with User B, the social network infrastructure correspondingly creates a negative weight between these users.

Still referring to FIG. 2, it is noted that one or more of the following leveraged capabilities may be provided: (a) the social network infrastructure can de-prioritize the User B recommendation to User A; (b) the social network infrastructure can de-prioritize the User A recommendation to User B, even if the User B has never previously been presented User A as a recommended relationship; (c) the social network infrastructure can further de-prioritize contact-of-contacts through the implicitly negative relationship; (d) the social network infrastructure can de-prioritize social network content (such as, for example, status updates) through the implicitly negative relationship (where access allows); (e) the social network infrastructure can de-prioritize social network content through contacts-of-contacts of the negative relationship; (f) the social network infrastructure can prioritize recommendations of, or to, users that also have a high confidence of skipping a relationship with User B; and/or the social network infrastructure can prioritize content of users that also have a high confidence of skipping a relationship with User B.

Figure 3:
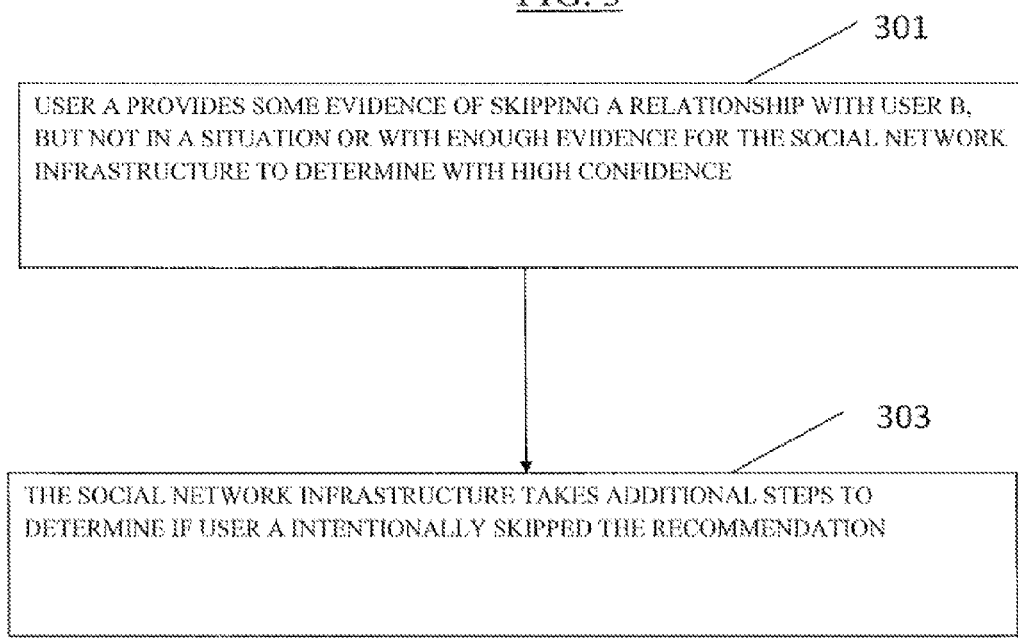
FIG. 3 depicts a flowchart showing a number of example steps associated with a mechanism discussed herein with respect to confirming a recommendation as a bad recommendation according to an embodiment.

Referring now to FIG. 3, depicted is a flowchart showing a number of example steps associated with the mechanism discussed above with respect to confirming a recommendation as a bad recommendation. As seen from this FIG. 3, the example steps comprise the following: at 301—User A provides some evidence of skipping a relationship with User B, but not in a situation or with enough evidence for the social network infrastructure to determine with high confidence; and at 303—the social network infrastructure takes additional steps to determine if User A intentionally skipped the recommendation.

Still referring to FIG. 3, it is noted that one or more of the following leveraged capabilities may be provided: (a) the social network infrastructure places the skipped recommendation between two new recommendations with high confidence for the user to select; (b) the social network infrastructure places the skipped recommendation near another recommendation with high confidence for the user to select; (c) the social network infrastructure applies additional analytics to content User A may be exposed to from User B (for example, activity stream updates), to determine time spent reading content from User B; (d) the social network infrastructure analyzes any other interactions between User A and User B (for example "likes" or visiting of the profile page to build evidence of avoidance); (e) the social network infrastructure collects a set of users that User A has avoided, and presents to User A such a set of users in a "should we skip these users for you?" confirmation; (f) the social network infrastructure builds further evidence based on other users who have avoided User B, to determine if User B is frequently avoided; (g) the social network infrastructure builds further evidence based on other users similar to User A who have avoided User B, to determine implicit negative relationships on a broader scale.

Figure 4:
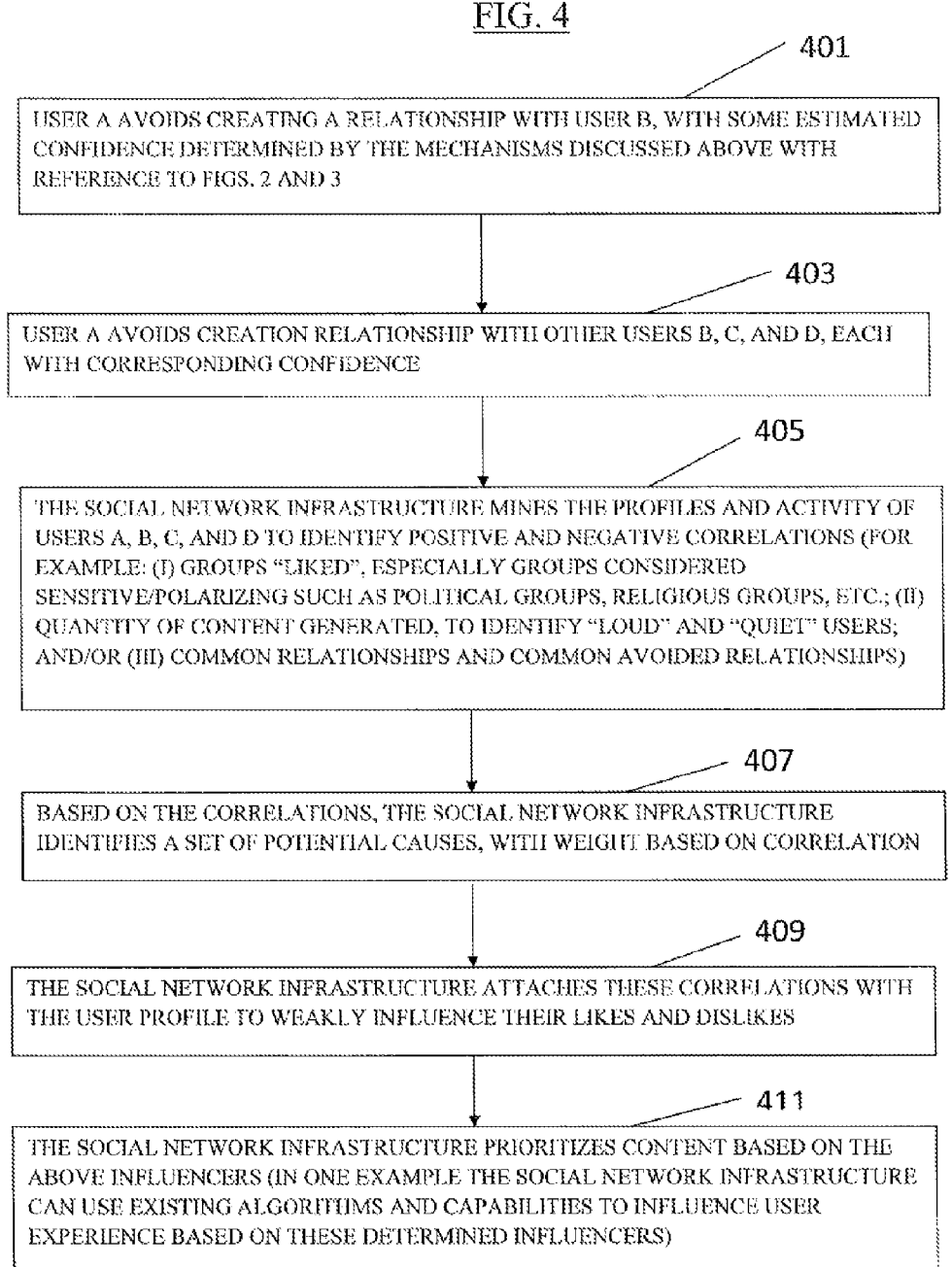
FIG. 4 depicts a flowchart showing a number of example steps associated with a mechanism discussed herein with respect to determining the cause of a implicitly negative relationship according to an embodiment.

Referring now to FIG. 4, depicted is a flowchart showing a number of example steps associated with the mechanism discussed above with respect to determining the cause of an implicitly negative relationship. As seen from this Fig., the example steps comprise the following: at 401—User A avoids creating a relationship with User B, with some estimated confidence determined by the mechanisms discussed above with reference to FIGS. 2 and 3; at 403—User A avoids creation relationship with other Users B, C, and D, each with corresponding confidence; at 405—the social network infrastructure mines the profiles and activity of users A, B, C, and D to identify positive and negative correlations (for example: (i) groups "liked", especially groups considered sensitive/polarizing such as political groups, religious groups, etc.; (ii) quantity of content generated, to identify "loud" and "quiet" users; and/or (iii) common relationships and common avoided relationships);

at 407—based on the correlations, the social network infrastructure identifies a set of potential causes, with weight based on correlation; at 409—the social network infrastructure attaches these correlations with the user profile to weakly influence their likes and dislikes; and at 411—the social network infrastructure prioritizes content based on the above influencers (in one example the social network infrastructure can use existing algorithms and capabilities to influence user experience based on these determined influencers).

Still referring to FIG. 4, it is noted that what is being done is not simply prioritizing shared correlations between Users A and B. For example, the social network infrastructure may determine User A probably avoids all "politically-aligned" and "loud" users, and the social network infrastructure can make this determination entirely based on relationships User A has avoided creating (without resort to explicit evidence based on User A activity).

Still referring to FIG. 4, it is noted that one or more of the following leveraged capabilities may be provided: (a) if the cause of the negative correlation changes (for example, if User B switches from being "loud" to "quiet" over time), restore prioritization of User B and his/her content; (b) de-prioritize recommendations of relationships based on negative correlations; (c) prioritize recommendations of relationships based on lack of negative correlations; (d) de-prioritize content from other users based on negative correlations; (e) prioritize content from other users based on lack of negative correlations; (f) de-prioritize content related to negative correlations (e.g., group recommendations, network updates, shares through friends, etc.); (g) prioritize content based on groups that have a negative relationship with the negative correlations (e.g., if avoiding "loud" users, then prioritize "quiet" users); (h) collect a set of potential correlations and explicitly present them to the user to query the user's likes and dislikes (e.g., in order to strengthen the correlations).

Figure 5:
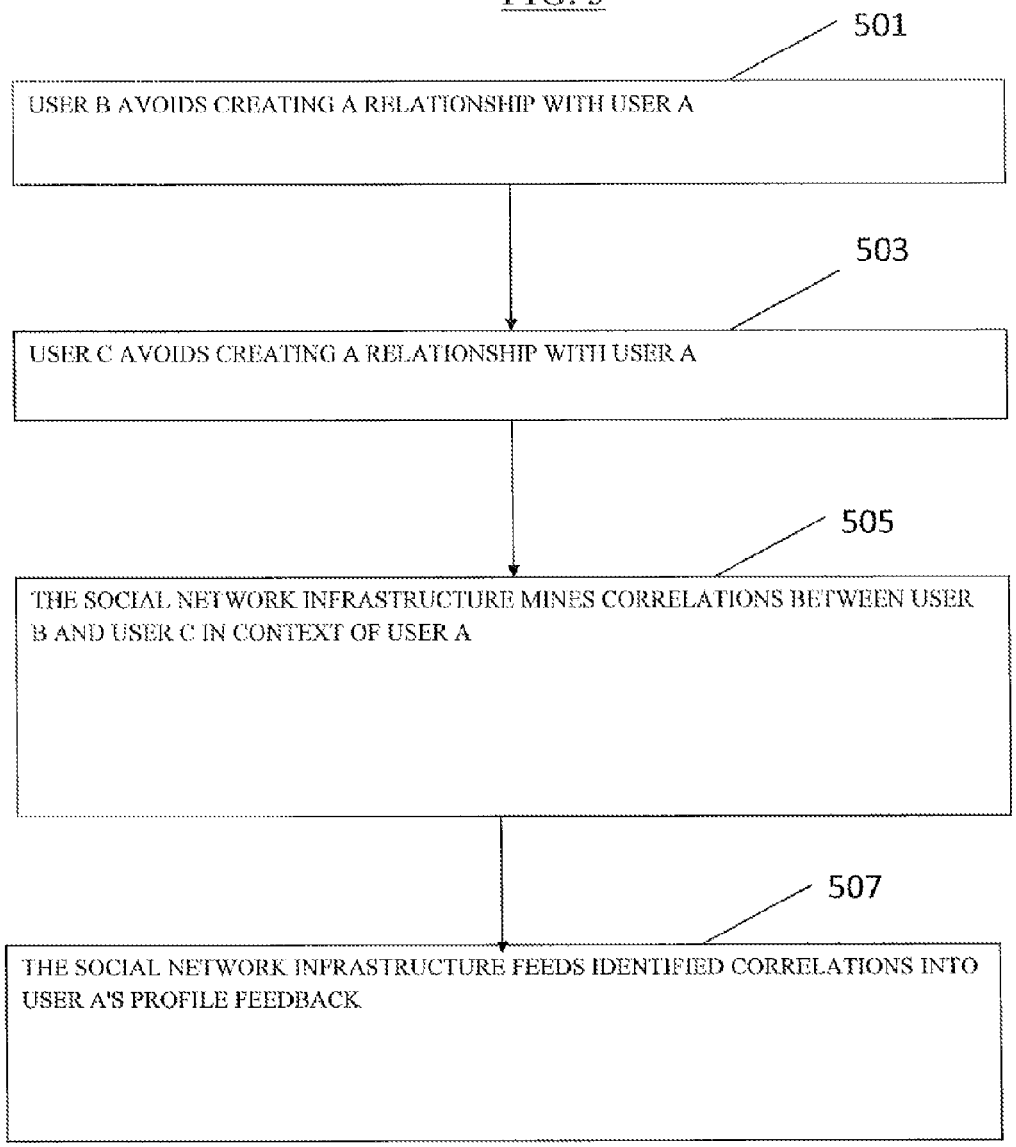
FIG. 5 depicts a flowchart showing a number of example steps associated with a mechanism discussed herein with respect to improvement of negative relationships according to an embodiment.

Referring now to FIG. 5, depicted is a flowchart showing a number of example steps associated with the mechanism discussed above with respect to improvement of negative relationships. As seen from this Fig., the example steps comprise the following: at 501—User B avoids creating a relationship with User A; at 503—User C avoids creating a relationship with User A; at 505—the social network infrastructure mines correlations between User B and User C in context of User A; and at 507—the social network infrastructure feeds identified correlations into User A's profile feedback.

Still referring to FIG. 5, it is noted that one or more of the following leveraged capabilities may be provided: (a) recommendation to improve User A's social content (for example, to create shorter posts or avoid posts of certain topics); (b) recommendation to improve User A's social network contacts (for example, create relationships with certain key people); (c) other areas for improvement in recommendations: groups, games, videos, photos, tagging, volume of content.

Figure 6:
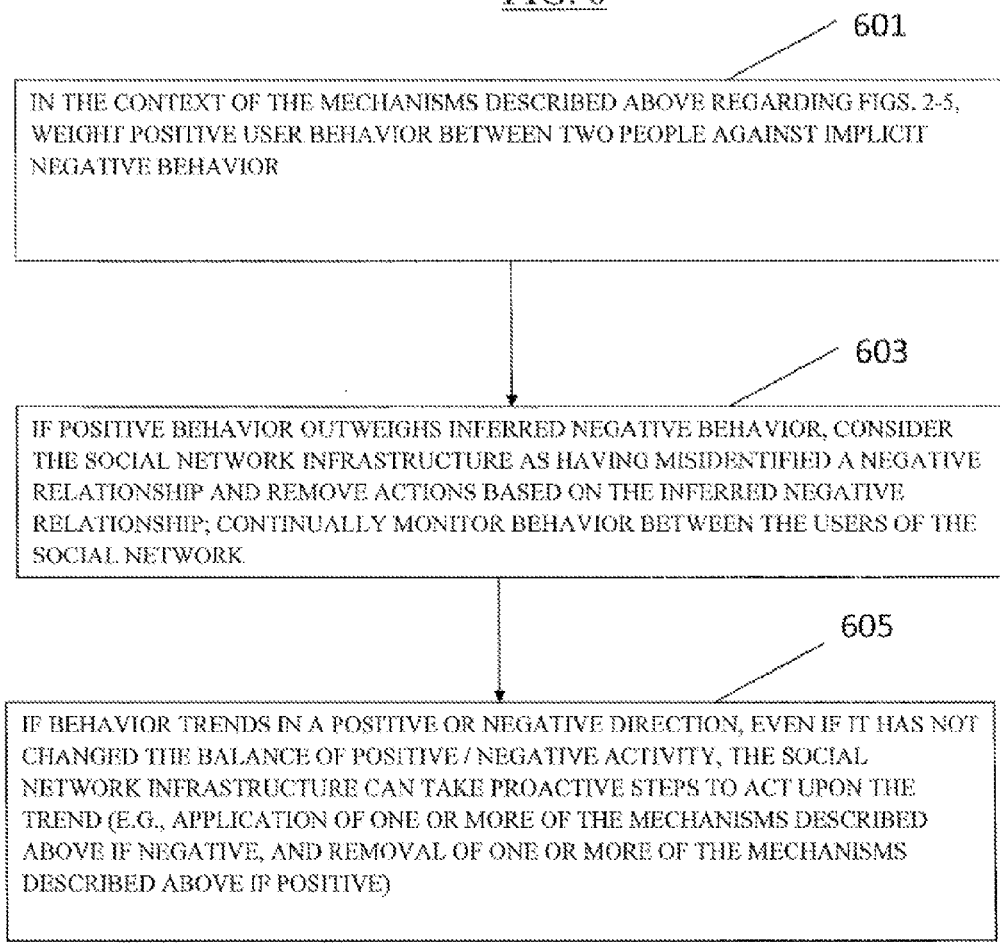
FIG. 6 depicts a flowchart showing a number of example steps associated with a mechanism discussed herein with respect to discontinuation of negative attribution according to an embodiment.

Referring now to FIG. 6, depicted is a flowchart showing a number of example steps associated with the mechanism discussed above with respect to discontinuation of negative attribution. As seen from this Fig., the example steps comprise the following: at 601—in the context of the mechanisms described above regarding FIGS. 2-5, weight positive user behavior between two people against implicit negative behavior; at 603—if positive behavior outweighs inferred negative behavior, consider the social network infrastructure as having misidentified a negative relationship and remove actions based on the inferred negative relationship; continually monitor behavior between the users of the social network; at 605—if behavior trends in a positive or negative direction, even if it has not changed the balance of positive/negative activity, the social network infrastructure can take proactive steps to act upon the trend (e.g., application of one or more of the mechanisms described above if negative, and removal of one or more of the mechanisms described above if positive). In one example, a change in the behavior trends between users can be a strong indicator (in one specific example, two users who have not been connecting on a social network start tagging each other on photos; there may not yet be enough confidence to determine that a negative relationship was calculated in error but, even so, the social network infrastructure could start doing things like re-introducing one of these users to the other as a friend recommendation for a window of time).

Still referring to FIG. 6, it is noted that the following leveraged capability may be provided: addition or removal of capabilities described above, based upon changes in attribution. In one specific example, a change in the behavior (and especially explicit behavior) that contradicts implicit inferences can be given a higher weight, or a higher weight for a limited period of time.

Figure 7:
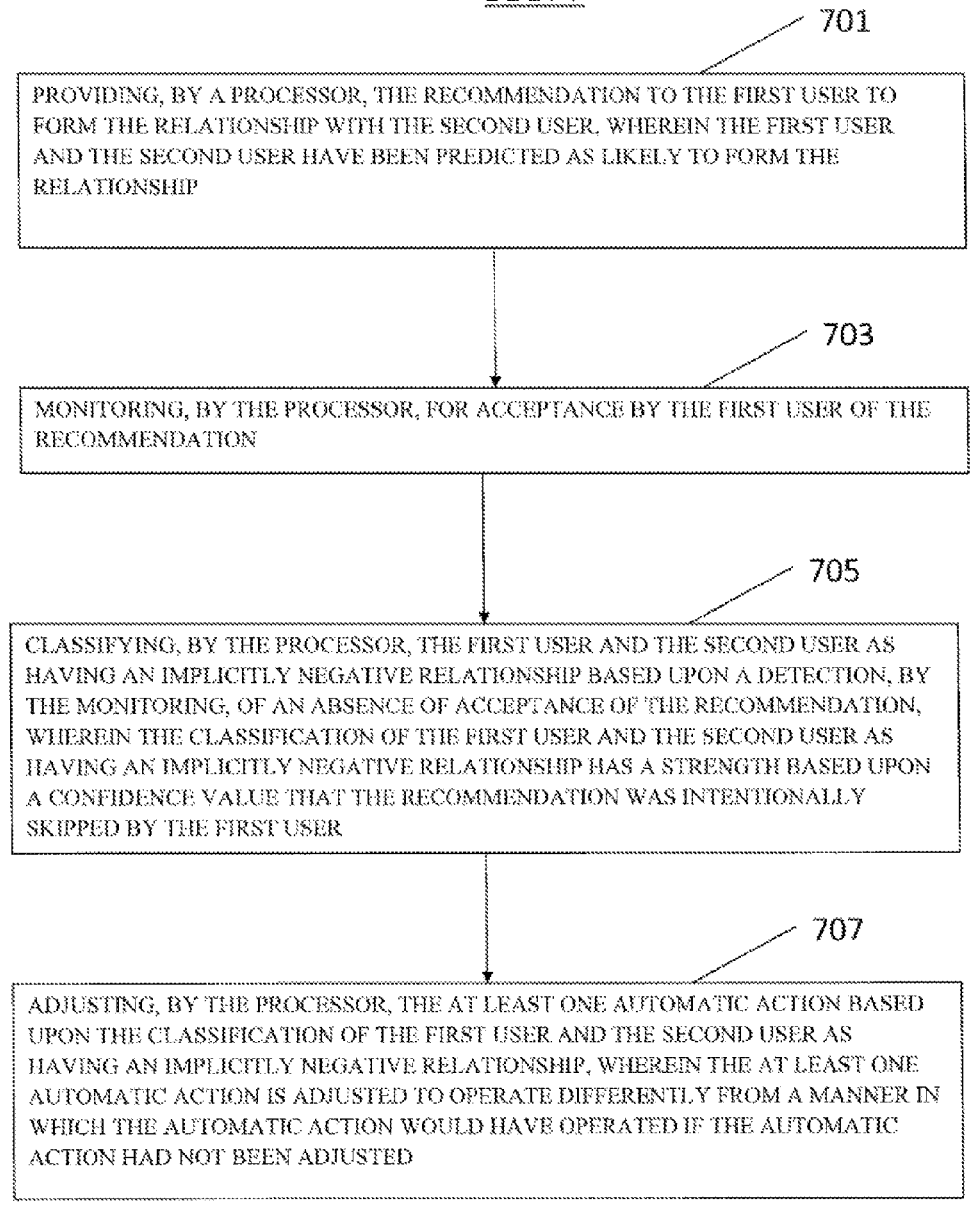
FIG. 7 depicts a flowchart of a method according to an embodiment.

Referring now to FIG. 7, a method for adjusting at least one automatic action associated with a social network based upon an absence of an acceptance of a recommendation to a first user to form a social network relationship with a second user is shown. As seen in this FIG. 7, the method of this embodiment comprises: at 701—providing, by a processor, the recommendation to the first user to form the relationship with the second user, wherein the first user and the second user have been predicted as likely to form the relationship; at 703—monitoring, by the processor, for acceptance by the first user of the recommendation; at 705—classifying, by the processor, the first user and the second user as having an implicitly negative relationship based upon a detection, by the monitoring, of an absence of acceptance of the recommendation, wherein the classification of the first user and the second user as having an implicitly negative relationship has a strength based upon a confidence value that the recommendation was intentionally skipped by the first user; and at 707—adjusting, by the processor, the at least one automatic action based upon the classification of the first user and the second user as having an implicitly negative relationship, wherein the at least one automatic action is adjusted to operate differently from a manner in which the automatic action would have operated if the automatic action had not been adjusted.

Figure 8:
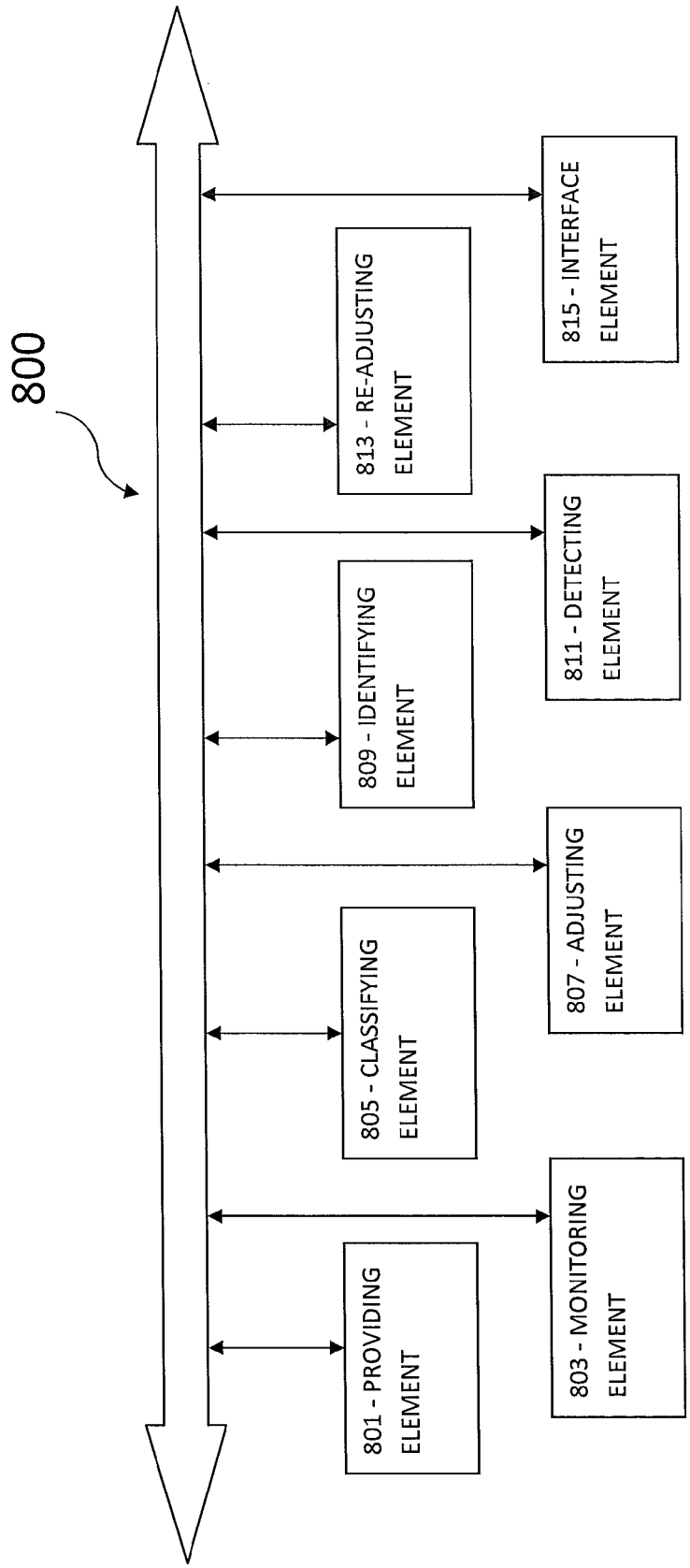
FIG. 8 depicts a block diagram of a system according to an embodiment.

Referring now to FIG. 8, a system 800 for adjusting at least one automatic action associated with a social network based upon an absence of an acceptance of a recommendation to a first user to form a social network relationship with a second user is provided. This system may include a processor (not shown); and a memory (not shown) storing computer readable instructions that, when executed by the processor, implement: a providing element 801 configured to provide the recommendation to the first user to form the relationship with the second user, wherein the first user and the second user have been predicted as likely to form the relationship; a monitoring element 803 configured to monitor for acceptance by the first user of the recommendation; a classifying element 805 configured to classify the first user and the second user as having an implicitly negative relationship based upon a detection, by the monitoring element, of an absence of acceptance of the recommendation, wherein the classification of the first user and the second user as having an implicitly negative relationship has a strength based upon a confidence value that the recommendation was intentionally skipped by the first user; and an adjusting element 807 configured to adjust the at least one automatic action based upon the classification of the first user and the second user as having an implicitly negative relationship, wherein the at least one automatic action is adjusted to operate differently from a manner in which the automatic action would have operated if the automatic action had not been adjusted.

Still referring to FIG. 8, the computer readable instructions, when executed by the processor, may further implement an identifying element 809 configured identify a cause of the absence of acceptance of the recommendation. In addition, the computer readable instructions, when executed by the processor, may further implement: a detecting element 811 configured to detect an elimination of the cause of the absence of acceptance of the recommendation; and a re-adjusting element 813 configured, responsive to the detection of the elimination of the cause of the absence of acceptance of the recommendation, to re-adjust the at least one automatic action, wherein the at least one automatic action is re-adjusted back to operate in a manner that the automatic action would have operated had the automatic action not been adjusted. Moreover, the computer readable instructions, when executed by the processor, may further implement an interface element 815 configured to provide a user interface to allow the first user to confirm the classification of having an implicitly negative relationship with the second user.

In one example, communication between and among the various components of FIG. 8 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 9.

Figure 9:
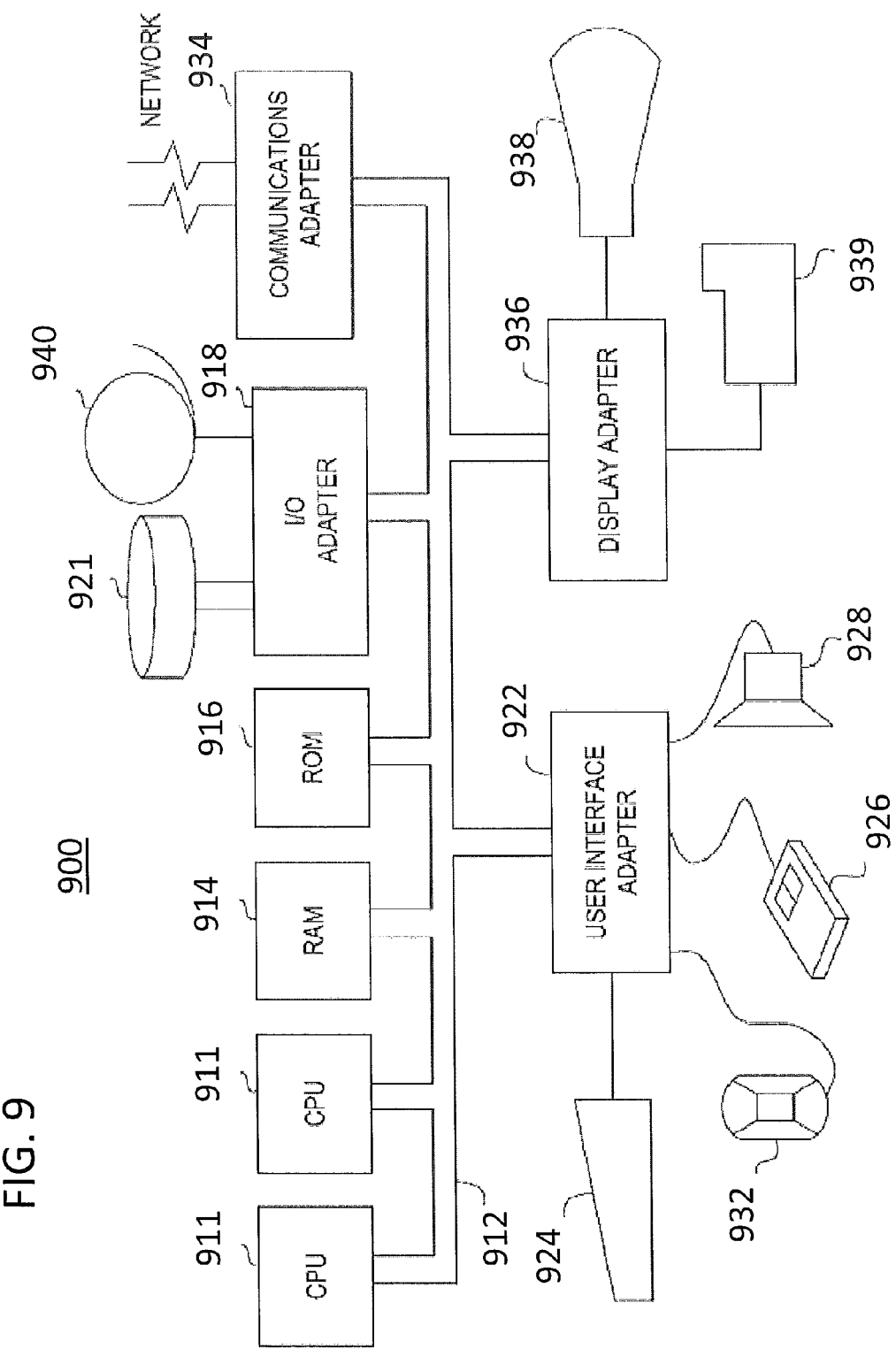
FIG. 9 depicts a block diagram of a system according to an embodiment.

Referring now to FIG. 9, this figure shows a hardware configuration of computing system 900 according to an embodiment of the present invention. As seen, this hardware configuration has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communications adapter 934 for connecting the system 900 to a data processing network, the Internet, an Intranet, a local area network (LAN), etc., and a display adapter 936 for connecting the bus 912 to a display device 938 and/or printer 939 (e.g., a digital printer or the like).

In one specific example, the connections or relationships may be of the "friend" type (such as in the context of a personal social network). In another specific example, the connections or relationships may be of the "contact" type (such as in the context of a business-oriented social network).

As described herein, various embodiments may be applied in the context of social software, social computing, collaboration and communications.

In one embodiment, a computer-implemented method for adjusting at least one automatic action associated with a social network based upon an absence of an acceptance of a recommendation to a first user to form a social network relationship with a second user is provided, the method comprising: providing, by a processor, the recommendation to the first user to form the relationship with the second user, wherein the first user and the second user have been predicted as likely to form the relationship; monitoring, by the processor, for acceptance by the first user of the recommendation; classifying, by the processor, the first user and the second user as having an implicitly negative relationship based upon a detection, by the monitoring, of an absence of acceptance of the recommendation, wherein the classification of the first user and the second user as having an implicitly negative relationship has a strength based upon a confidence value that the recommendation was intentionally skipped by the first user; and adjusting, by the processor, the at least one automatic action based upon the classification of the first user and the second user as having an implicitly negative relationship, wherein the at least one automatic action is adjusted to operate differently from a manner in which the automatic action would have operated if the automatic action had not been adjusted.

In one example, the confidence value is derived from data selected from at least one of: (a) a history of communications by the first user; (b) a history of communications by the second user; (c) a history of recommendations accepted by the first user; (d) a history of recommendations accepted by the second user; (e) a history of recommendations not accepted by the first user; and (f) a history of recommendations not accepted by the second user.

In another example, the confidence value is derived from the data using at least one of: (a) natural language processing; and (b) analytic analysis.

In another example, the method further comprises identifying, by the processor, a cause of the absence of acceptance of the recommendation.

In another example, the method further comprises: detecting, by the processor, an elimination of the cause of the absence of acceptance of the recommendation; and re-adjusting by the processor, responsive to the detection of the elimination of the cause of the absence of acceptance of the recommendation, the at least one automatic action.

In another example, the at least one automatic action is re-adjusted back to operate in a manner that the automatic action would have operated had the automatic action not been adjusted.

In another example, the method further comprises providing, by the processor, a user interface configured to allow the first user to confirm the classification of having an implicitly negative relationship with the second user.

In another embodiment, a computer readable storage medium, tangibly embodying a program of instructions executable by the computer for adjusting at least one automatic action associated with a social network based upon an absence of an acceptance of a recommendation to a first user to form a social network relationship with a second user is provided, the program of instructions, when executing, performing the following steps: providing the recommendation to the first user to form the relationship with the second user, wherein the first user and the second user have been predicted as likely to form the relationship; monitoring for acceptance by the first user of the recommendation; classifying the first user and the second user as having an implicitly negative relationship based upon a detection, by the monitoring, of an absence of acceptance of the recommendation, wherein the classification of the first user and the second user as having an implicitly negative relationship has a strength based upon a confidence value that the recommendation was intentionally skipped by the first user; and adjusting the at least one automatic action based upon the classification of the first user and the second user as having an implicitly negative relationship, wherein the at least one automatic action is adjusted to operate differently from a manner in which the automatic action would have operated if the automatic action had not been adjusted.

In one example, the confidence value is derived from data selected from at least one of: (a) a history of communications by the first user; (b) a history of communications by the second user; (c) a history of recommendations accepted by the first user; (d) a history of recommendations accepted by the second user; (e) a history of recommendations not accepted by the first user; and (f) a history of recommendations not accepted by the second user.

In another example, the confidence value is derived from the data using at least one of: (a) natural language processing; and (b) analytic analysis.

In another example, the program of instructions, when executing, further performs identifying a cause of the absence of acceptance of the recommendation.

In another example, the program of instructions, when executing, further performs: detecting an elimination of the cause of the absence of acceptance of the recommendation; and re-adjusting, responsive to the detection of the elimination of the cause of the absence of acceptance of the recommendation, the at least one automatic action.

In another example, the at least one automatic action is re-adjusted back to operate in a manner that the automatic action would have operated had the automatic action not been adjusted.

In another example, the program of instructions, when executing, further performs providing a user interface configured to allow the first user to confirm the classification of having an implicitly negative relationship with the second user.

In another embodiment, a computer-implemented system for adjusting at least one automatic action associated with a social network based upon an absence of an acceptance of a recommendation to a first user to form a social network relationship with a second user is provided, the system comprising: a processor; and a memory storing computer readable instructions that, when executed by the processor, implement: a providing element configured to provide the recommendation to the first user to form the relationship with the second user, wherein the first user and the second user have been predicted as likely to form the relationship; a monitoring element configured to monitor for acceptance by the first user of the recommendation; a classifying element configured to classify the first user and the second user as having an implicitly negative relationship based upon a detection, by the monitoring element, of an absence of acceptance of the recommendation, wherein the classification of the first user and the second user as having an implicitly negative relationship has a strength based upon a confidence value that the recommendation was intentionally skipped by the first user; and an adjusting element configured to adjust the at least one automatic action based upon the classification of the first user and the second user as having an implicitly negative relationship, wherein the at least one automatic action is adjusted to operate differently from a manner in which the automatic action would have operated if the automatic action had not been adjusted.

In one example, the confidence value is derived from data selected from at least one of: (a) a history of communications by the first user; (b) a history of communications by the second user; (c) a history of recommendations accepted by the first user; (d) a history of recommendations accepted by the second user; (e) a history of recommendations not accepted by the first user; and (f) a history of recommendations not accepted by the second user.

In another example, the confidence value is derived from the data using at least one of: (a) natural language processing; and (b) analytic analysis.

In another example, the computer readable instructions, when executed by the processor, further implement an identifying element configured identify a cause of the absence of acceptance of the recommendation.

In another example, the computer readable instructions, when executed by the processor, further implement: a detecting element configured to detect an elimination of the cause of the absence of acceptance of the recommendation; and a re-adjusting element configured, responsive to the detection of the elimination of the cause of the absence of acceptance of the recommendation, to re-adjust the at least one automatic action, wherein the at least one automatic action is re-adjusted back to operate in a manner that the automatic action would have operated had the automatic action not been adjusted.

In another example, the computer readable instructions, when executed by the processor, further implement an interface element configured to provide a user interface to allow the first user to confirm the classification of having an implicitly negative relationship with the second user.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for adjusting at least one automatic action associated with a social network based upon an absence of an acceptance of a recommendation to a first user to form a social network relationship with a second user, the method comprising:

providing, by a processor, the recommendation to the first user to form the relationship with the second user, wherein the first user and the second user have been predicted as likely to form the relationship;

monitoring, by the processor, for acceptance by the first user of the recommendation;

classifying, by the processor, the first user and the second user as having an implicitly negative relationship based upon a detection, by the monitoring, of an absence of acceptance of the recommendation, wherein the classification of the first user and the second user as having an implicitly negative relationship has a strength based upon a confidence value that the recommendation was intentionally skipped by the first user;

adjusting, by the processor, the at least one automatic action based upon the classification of the first user and the second user as having an implicitly negative relationship, wherein the at least one automatic action is adjusted to operate differently from a manner in which the automatic action would have operated if the automatic action had not been adjusted;

identifying, by the processor, a cause of the absence of acceptance of the recommendation;

detecting, by the processor, an elimination of the cause of the absence of acceptance of the recommendation; and re-adjusting by the processor, responsive to the detection of the elimination of the cause of the absence of acceptance of the recommendation, the at least one automatic action.

2. The method of claim 1, wherein the confidence value is derived from data selected from at least one of: (a) a history of communications by the first user; (b) a history of communications by the second user; (c) a history of recommendations accepted by the first user; (d) a history of recommendations accepted by the second user; (e) a history of recommendations not accepted by the first user; and (f) a history of recommendations not accepted by the second user.

3. The method of claim 2, wherein the confidence value is derived from the data using at least one of: (a) natural language processing; and (b) analytic analysis.

4. The method of claim 1, wherein the at least one automatic action is re-adjusted back to operate in a manner that the automatic action would have operated had the automatic action not been adjusted.

5. The method of claim 1, further comprising providing, by the processor, a user interface configured to allow the first user to confirm the classification of having an implicitly negative relationship with the second user.

6. A non-transitory computer readable storage medium, tangibly embodying a program of instructions executable by the computer for adjusting at least one automatic action associated with a social network based upon an absence of an acceptance of a recommendation to a first user to form a social network relationship with a second user, the program of instructions, when executing, performing the following steps:

provided the recommendation to the first user to form the relationship with the second user, wherein the first user and the second user have been predicted as likely to form the relationship;

monitoring for acceptance by the first user of the recommendation;

classifying the first user and the second user as having an implicitly negative relationship based upon a detection, by the monitoring, of an absence of acceptance of the recommendation, wherein the classification of the first user and the second user as having an implicitly negative relationship has a strength based upon a confidence value that the recommendation was intentionally skipped by the first user;

adjusting the at least one automatic action based upon the classification of the first user and the second user as having an implicitly negative relationship, wherein the at least one automatic action is adjusted to operate differently from a manner in which the automatic action would have operated if the automatic action had not been adjusted;

identifying a cause of the absence of acceptance of the recommendation;

detecting an elimination of the cause of the absence of acceptance of the recommendation; and re-adjusting, responsive to the detection of the elimination of the cause of the absence of acceptance of the recommendation, the at least one automatic action.

7. The non-transitory computer readable storage medium of claim 6, wherein the confidence value is derived from data selected from at least one of: (a) a history of communications by the first user; (b) a history of communications by the second user; (c) a history of recommendations accepted by the first user; (d) a history of recommendations accepted by the second user; (e) a history of recommendations not accepted by the first user; and (f) a history of recommendations not accepted by the second user.

8. The non-transitory computer readable storage medium of claim 7, wherein the confidence value is derived from the data using at least one of: (a) natural language processing; and (b) analytic analysis.

9. The non-transitory computer readable storage medium of claim 6, wherein the at least one automatic action is re-adjusted back to operate in a manner that the automatic action would have operated had the automatic action not been adjusted.

10. The non-transitory computer readable storage medium of claim 6, wherein the program of instructions, when executing, further performs providing a user interface configured to allow the first user to confirm the classification of having an implicitly negative relationship with the second user.

11. A computer-implemented system for adjusting at least one automatic action associated with a social network based upon an absence of an acceptance of a recommendation to a first user to form a social network relationship with a second user, the system comprising:

a processor; and a memory storing computer readable instructions that, when executed by the processor, implement:

a providing element configured to provide the recommendation to the first user to form the relationship with the second user, wherein the first user and the second user have been predicted as likely to form the relationship;

a monitoring element configured to monitor for acceptance by the first user of the recommendation;

a classifying element configured to classify the first user and the second user as having an implicitly negative relationship based upon a detection, by the monitoring element, of an absence of acceptance of the recommendation, wherein the classification of the first user and the second user as having an implicitly negative relationship has a strength based upon a confidence value that the recommendation was intentionally skipped by the first user;

an adjusting element configured to adjust the at least one automatic action based upon the classification of the first user and the second user as having an implicitly negative relationship, wherein the at least one automatic action is adjusted to operate differently from a manner in which the automatic action would have operated if the automatic action had not been adjusted;

an identifying element configured to identify a cause of the absence of acceptance of the recommendation;

a detecting element configured to detect an elimination of the cause of the absence of acceptance of the recommendation; and a re-adjusting element configured, responsive to the detection of the elimination of the cause of the absence of acceptance of the recommendation, to re-adjust the at least one automatic action, wherein the at least one automatic action is re-adjusted back to operate in a manner that the automatic action would have operated had the automatic action not been adjusted.

12. The system of claim 11, wherein the confidence value is derived from data selected from at least one of: (a) a history of communications by the first user; (b) a history of communications by the second user; (c) a history of recommendations accepted by the first user; (d) a history of recommendations accepted by the second user; (e) a history of recommendations not accepted by the first user; and (f) a history of recommendations not accepted by the second user.

13. The system of claim 12, wherein the confidence value is derived from the data using at least one of: (a) natural language processing; and (b) analytic analysis.

14. The system of claim 11, wherein the computer readable instructions, when executed by the processor, further implement an interface element configured to provide a user interface to allow the first user to confirm the classification of having an implicitly negative relationship with the second user.

* * * * *